US010268204B2

United States Patent
Tong et al.

(10) Patent No.: US 10,268,204 B2
(45) Date of Patent: Apr. 23, 2019

(54) CROSS TRAFFIC DETECTION USING CAMERAS

(71) Applicant: GM Global Technology Operations LLC, Detroit, MI (US)

(72) Inventors: Wei Tong, Troy, MI (US); Shuqing Zeng, Sterling Heights, MI (US); Upali P. Mudalige, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 65 days.

(21) Appl. No.: 15/690,966

(22) Filed: Aug. 30, 2017

(65) Prior Publication Data

US 2019/0064841 A1    Feb. 28, 2019

(51) Int. Cl.

| | |
|---|---|
| *G01C 22/00* | (2006.01) |
| *G05D 1/02* | (2006.01) |
| *G06K 9/00* | (2006.01) |
| *G06T 7/11* | (2017.01) |
| *G06K 9/46* | (2006.01) |
| *G06K 9/62* | (2006.01) |
| *G06T 7/20* | (2017.01) |
| *G05D 1/00* | (2006.01) |

(52) U.S. Cl.
CPC ......... *G05D 1/0253* (2013.01); *G05D 1/0212* (2013.01); *G06K 9/00805* (2013.01); *G06K 9/4604* (2013.01); *G06K 9/6267* (2013.01); *G06T 7/11* (2017.01); *G06T 7/20* (2013.01); *G05D 1/0088* (2013.01); *G06T 2210/12* (2013.01)

(58) Field of Classification Search
CPC ....... G05D 1/0253; G05D 1/0212; G06T 7/11
See application file for complete search history.

(56) References Cited

U.S. PATENT DOCUMENTS

| | | | |
|---|---|---|---|
| 2017/0270375 A1* | 9/2017 | Grauer | G01S 17/107 |
| 2018/0067495 A1* | 3/2018 | Oder | B60W 10/184 |
| 2018/0173971 A1* | 6/2018 | Jia | G06K 9/00805 |

* cited by examiner

*Primary Examiner* — Adam M Alharbi
(74) *Attorney, Agent, or Firm* — Cantor Colburn LLP

(57) ABSTRACT

A vehicle, system and method of driving of an autonomous vehicle. The vehicle includes a camera for obtaining an image of a surrounding region of the vehicle, an actuation device for controlling a parameter of motion of the vehicle, and a processor. The processor selects a context region within the image, wherein the context region including a detection region therein. The processor further estimates a confidence level indicative of the presence of at least a portion of the target object in the detection region and a bounding box associated with the target object, determines a proposal region from the bounding box when the confidence level is greater than a selected threshold, determines a parameter of the target object within the proposal region, and controls the actuation device to alter a parameter of motion of the vehicle based on the parameter of the target object.

17 Claims, 6 Drawing Sheets

CROSS TRAFFIC DETECTION USING CAMERAS

INTRODUCTION

The subject disclosure relates to autonomous vehicles and, in particular, to a system and method for detecting cross-traffic conditions using a camera disposed in an autonomous vehicle.

Autonomous vehicles rely primarily on radar systems and Lidar (light detection and ranging) systems embedded with the vehicle to locate target objects and to determine their parameters of motion. Urban intersections however are challenging environments for these detection systems. In such environments, target objects are far away, where they appear small and where Lidar does not provide enough resolution for reliable detection. In addition, urban environments generate noisy background clutter in which target objects can be occluded or obscured, frustrating radar systems. There is generally insufficient context information to distinguish target objects from background signals, therefore making it difficult to classify target objects. Additionally, radar systems are poor at determining velocity for objects moving across a field of view of the vehicle, such as in cross-traffic situations. Accordingly, it is desirable to provide a system for an autonomous vehicle to classify target objects in an urban environment.

SUMMARY

In one exemplary embodiment, a method of driving of an autonomous vehicle is disclosed. The method includes obtaining an image of a surrounding region of the vehicle using a camera, wherein the image includes at least a portion of a target object, selecting a context region within the image, wherein the context region includes a detection region, estimating a confidence level indicative of a presence of at least a portion of the target object in the detection region and a bounding box associated with the target object, determining a proposal region from the bounding box when the confidence level is greater than a selected threshold, determining a parameter of the target object within the proposal region, and altering a driving parameter of motion of the vehicle based on the parameter of the target object.

Feature maps of the target object are extracted from the context region, and the confidence level and the bounding box are determined from the extracted feature map. A plurality of proposal regions for the target object are determined for a plurality of context regions, the plurality of proposal regions are merged to form a merged region, and the proposal region is determined for the merged region. The target object is classified within the merged region.

In various embodiments, the camera includes a camera at a front end of the vehicle, a camera at a rear end of the vehicle, or a camera at a front end of the vehicle and a camera at a rear end of the vehicle. Movement of a plurality of temporally spaced bounding boxes is tracked in order to determine a movement of the target object. A velocity of the target object across a line of sight of the vehicle is determined.

In another exemplary embodiment, a system for driving an autonomous vehicle is disclosed. The system includes a camera configured to obtain an image of a surrounding region of the vehicle, an actuation device for controlling a parameter of motion of the vehicle, and a processor. The processor is configured to select a context region within the image, the context region including a detection region therein, estimate a confidence level indicative of the presence of at least a portion of the target object in the detection region and a bounding box associated with the target object, determine a proposal region from the bounding box when the confidence level is greater than a selected threshold, determine a parameter of the target object within the proposal region, and control the actuation device to alter a parameter of motion of the vehicle based on the parameter of the target object.

The processor is further configured to extract a feature map of the target object from the context region and determine the confidence level and the bounding box from the extracted feature map. The processor is further configured to determine a plurality of proposal regions for the target object from a plurality of context regions, merge the plurality of proposal regions to form a merged region, and determine the bounding box for the merged region. The processor is further configured to classify the target object in the merged region.

In various embodiments, the camera includes a camera at a front end of the vehicle, a camera at a rear end of the vehicle, or a camera at a front end of the vehicle and a camera at a rear end of the vehicle. The processor is further configured to track movement of a plurality of temporally spaced bounding boxes to determine a movement of the target object. The processor is further configured to determine a velocity of the target object across a line of sight of the vehicle.

In yet another exemplary embodiment, a vehicle is disclosed. The vehicle includes a camera configured to obtain an image of a surrounding region of the vehicle, an actuation device for controlling a parameter of motion of the vehicle, and a processor. The processor is configured to select a context region within the image, the context region including a detection region therein, estimate a confidence level indicative of the presence of at least a portion of the target object in the detection region and a bounding box associated with the target object, determine a proposal region from the bounding box when the confidence level is greater than a selected threshold, determine a parameter of the target object within the proposal region, and control the actuation device to alter the parameter of motion of the vehicle based on the parameter of the target object.

The processor is further configured to extract a feature map of the target object from the context region and determine the confidence level and the bounding box from the extracted feature map. The processor is further configured to determine a plurality of proposal regions for the target object from a plurality of context regions, merge the plurality of proposal regions to form a merged region and determine the bounding box for the merged region. The processor is further configured to classify the target object in the merged region.

In various embodiments, the camera includes a camera at a front end of the vehicle, a camera at a rear end of the vehicle, or a camera at a front end of the vehicle and a camera at a rear end of the vehicle. The processor is further configured to track movement of a plurality of temporally spaced bounding boxes to determine a movement of the target object across a line of sight of the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
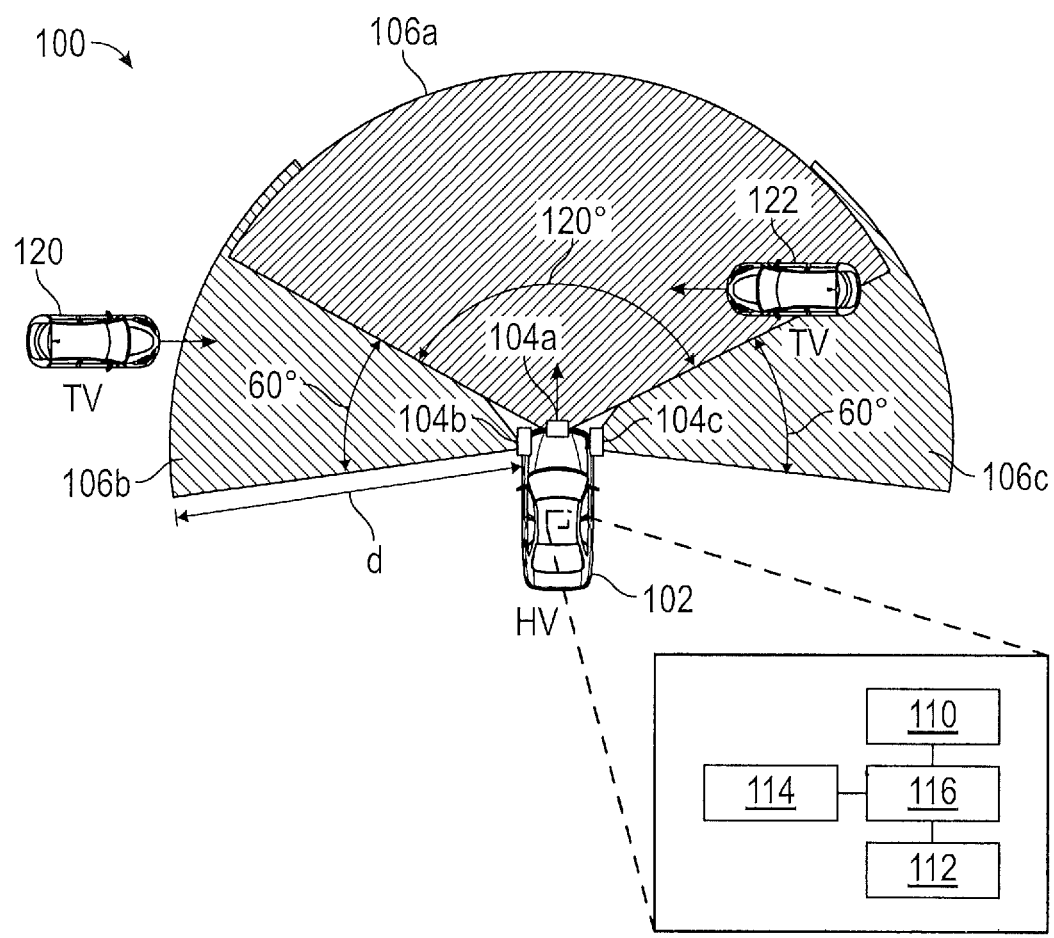
FIG. 1 shows a plan view of an autonomous vehicle in an environment with a cross-traffic condition.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the disclosure, FIG. 1 shows a plan view 100 of an autonomous vehicle 102 in an environment with a cross-traffic condition. The plan view 110 further shows target objects 120 and 122 moving across a line-of-sight of the vehicle 102. The vehicle 102 includes one or more cameras 104a, 104b and 104c for obtaining images of a surrounding area or region of the vehicle 102. The cameras 104a, 104b and 104c can be digital cameras that record an image in an array of pixels. A forward looking camera 104a disposed on the vehicle 102 obtains a view of a forward region 106a in front of the vehicle. Left-side camera 104b obtains a view of a side region 106b to the left of the vehicle 102. Right-side camera 104c obtains a view of a side region 106c to the right of the vehicle 102. In an illustrative embodiment, forward region 106a is a sector extending over an angle of about a 120 degrees, and side regions 106b and 106c are sectors extending over an angle of about 60 degrees. The cameras 104a, 104b and 104c can be arranged so that regions 106a, 106b and 106c are aligned to provide a 240-degree viewing angle for the vehicle 102. The cameras 104a, 104b and 104c are able to obtain images up to a selected distance d. A similar setup can be used to obtain a rear view. For rear view detection, cameras similar to cameras 104a, 104b and 104c are installed at the rear side of the vehicle 102. Rear view cameras can be useful when the vehicle 102 is moving in reverse and there is a need to know if there is cross traffic behind the vehicle 102.

The vehicle 102 further includes one or more internal state sensors 110 for measuring parameters of the internal operations of the vehicle 102. For example, an internal state sensor 110 may include a brake sensor, acceleration sensor, a steering wheel sensor, or other sensor that measures a parameter of motion of the vehicle 102, such as propulsion, braking, steering, etc.

The vehicle 102 further includes various actuation devices 112 for operating the vehicle 102, such as by controlling one or more parameters of motion of the vehicle 102 such as speed, orientation, steering angle, etc. Exemplary actuation devices 112 can include, but are not limited to, braking actuators, propulsion or throttle actuators, steering actuators, etc. These actuation devices 112 cause the vehicle 102 to speed up, slow down, steer, stop, change gear, change direction, etc. The measurements from the internal state sensors 110 along with the operation of the actuation devices 112 can be used to enable autonomous driving of the vehicle 102. The vehicle 102 further includes a communication module 114 that provides a communication link to a remote location or remote processor in order to transmit and receive data.

The vehicle 102 further includes a processor 116 that performs methods of vehicle navigation and of detection of target objects. The processor 116 receives one or more images from the cameras 104a, 104b and 104c, locates and classifies a target object within the one or more images and determines parameters of motion of the target object. The parameters may include a location, angular location, velocity of the target object, for example. The processor 116 can predict an outcome of driving the vehicle 102 based on the parameters of the target object and the internal state parameters of the vehicle 102 and can calculate and implement an updated internal state for providing a different outcome. For example, the processor 116 can determine that based on the location and velocity of the target object and based on the direction and velocity of vehicle 102 an impact with the target object is imminent. The processor 116 can then send a control signal to the actuation devices 112 in order to change a parameter of motion such as a speed or direction of the vehicle 102 in order to avoid impact with the target object. The processor 116 further performs methods for detecting and tracking target objects as disclosed herein.

Figure 2:
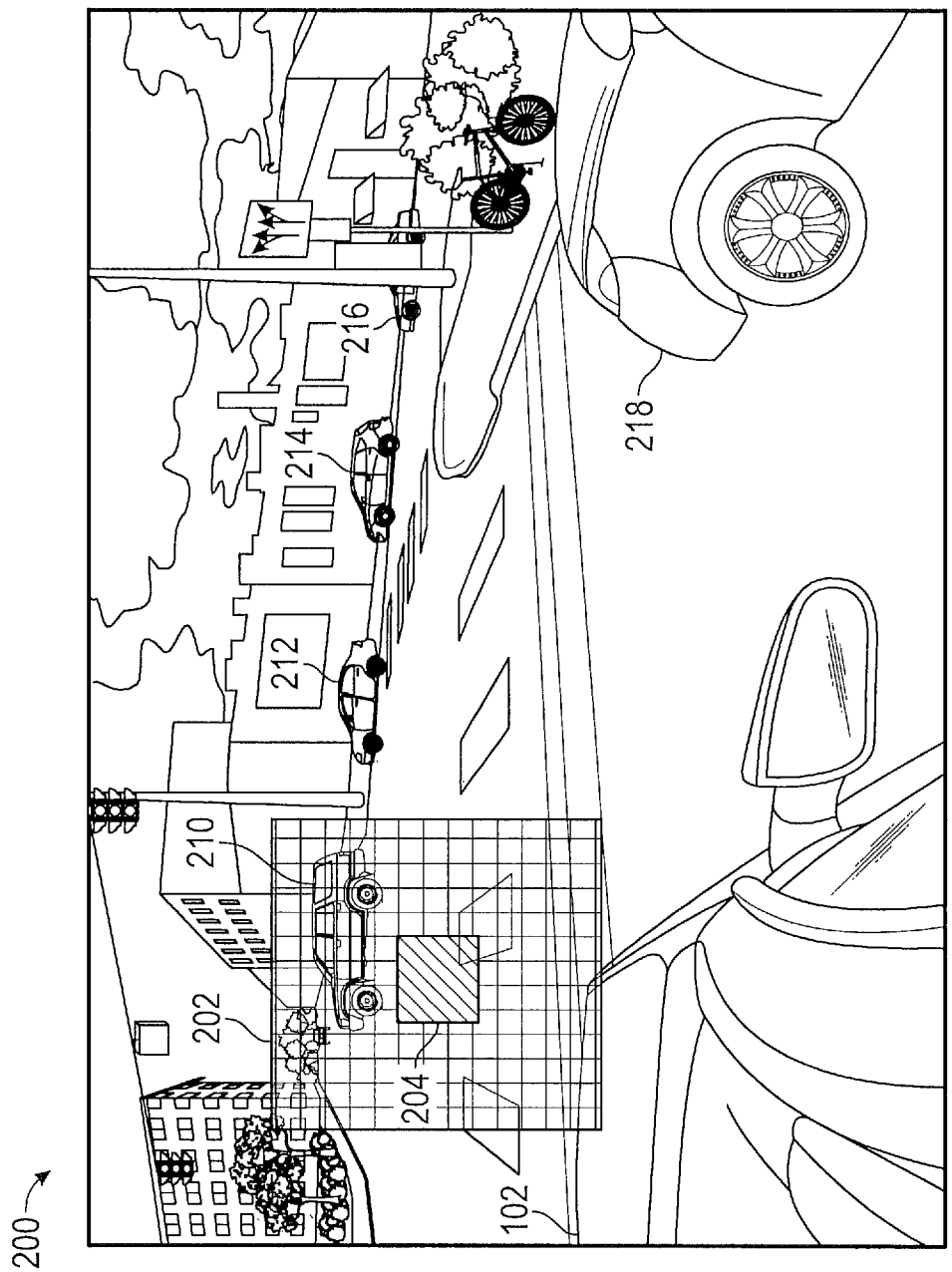
FIG. 2 shows an image taken from a forward camera of the autonomous vehicle of FIG. 1.

FIG. 2 shows an image 200 taken from a forward camera 104a of the vehicle 102 of FIG. 1. The image 200 shows a view of a forward region of vehicle 102. The vehicle 102 is at an intersection. Four target objects, also referred to herein as target vehicles 210, 212, 214, and 216 are proceeding into the intersection as part of cross-traffic. Another target vehicle 218 is in a lane next to vehicle 102. From the image 200, it is clear that some target vehicles (e.g., target vehicle 212) can blend into the environment, while another target vehicle (e.g., target vehicle 216) can be partially obscured by other features in the environment. The image 200 is provided as an example in order to illustrate the method for detecting target objects disclosed herein.

In one embodiment, the image 200 is a pixelate image obtained from a digital camera. The processor 102 can define a context region 202 over a section of the image 200. The context region 202 is a proper subset of the image 200. In an exemplary embodiment, the context region 202 is a 100 pixel by 100 pixel region of the image. However in other embodiments, the context region 202 can be any selected number of pixels. The context region 202 is sent to an image processor 116 which detects a target object or at least a part of a target object within a detection region 204 within the context region 202. The detection region 204 is an area inside the context region 202. A processor examines the detection region 204 to determine whether a target vehicle or part of a target vehicle can be located within the detection region 204. For the context region 202 shown in FIG. 2, the target vehicle 210 is inside the context region 202 but is not inside the detection region 204. Therefore, the image processor does not generate a positive detection for the target vehicle 210. In an exemplary embodiment, the detection region 204 is located at the center of the context region and the size of the detection region is 10×10 pixels. However in other embodiments, the location of the detection region 204 can be anywhere inside the context region 202 and can have a size that is any selected number of pixels, as long as the detection region 204 remains within the context region 202. The image processer can be a neural network such as a convolution neural network and generates from the context region 202 a probability that the target object or at least a part of the target object lies within the detection region 204. The processor 116 also determines a bounding box for the target object from the proposal region of interest or from a plurality of regions of interest, as discussed herein.

Figure 3:
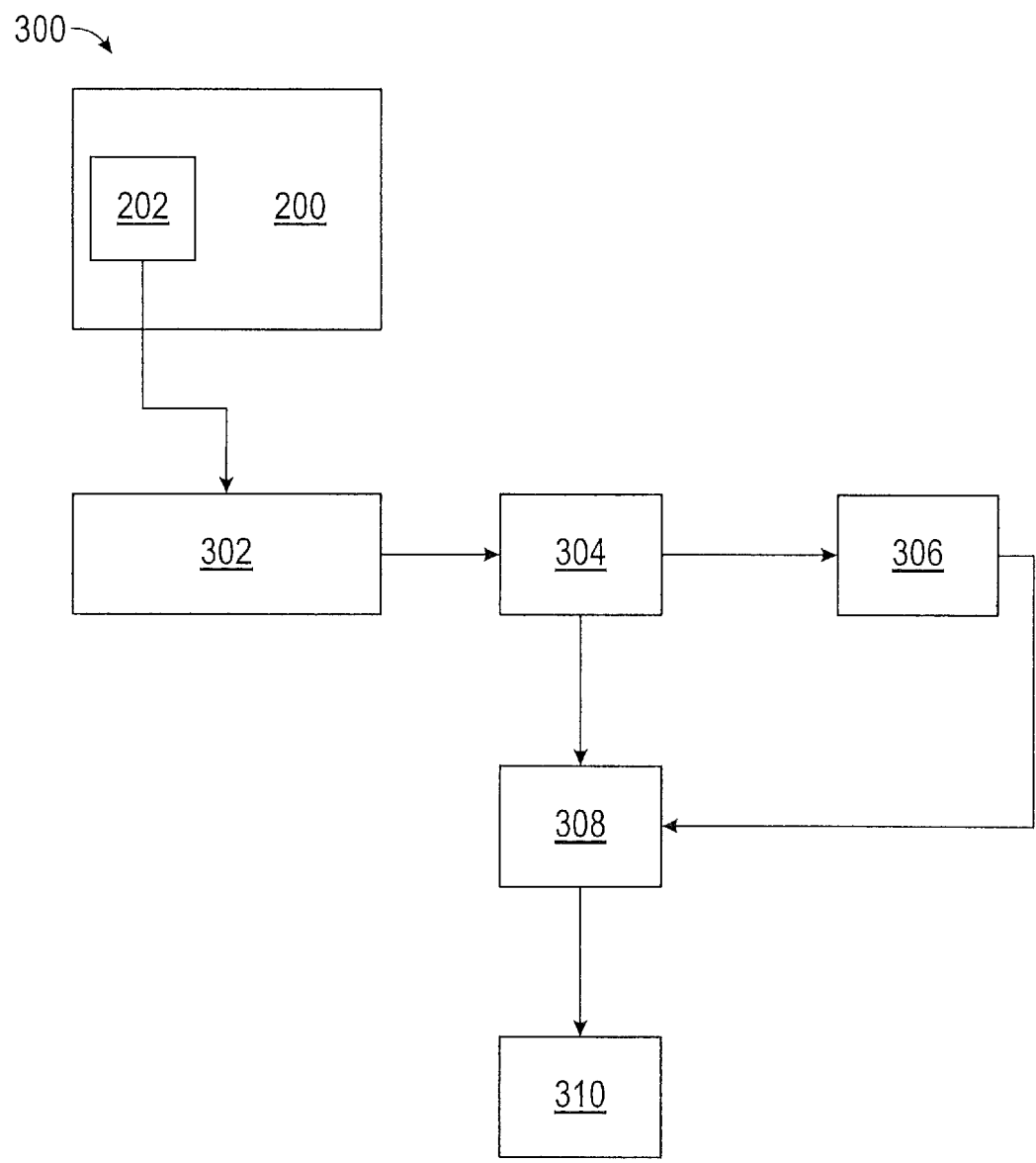
FIG. 3 illustrates a schematic diagram of a system for determining a target object from digital camera images.

FIG. 3 illustrates a schematic diagram 300 of a system for determining a target object from digital camera images. There are two major processing paths in the diagram 300. In the first path, the processor 116 receives the image 200 from the camera and scans a context region 202 through the image 200 starting from the top left corner of the image 200. The context region 202 scans from left to the right and from top to the bottom of the image 202 in a raster pattern until the entire image is processed. For each location of the context region 202, a convolution neural network 302 extracts a set of feature maps 304 from the context region 202 and feeds the feature maps 304 into a proposal network 306. The proposal network 306 generates two outputs. The first output is a confidence score which indicates how likely a target vehicle or a portion of a target vehicle is to be found inside the detection region 204 of the context region 202. The second output is a location, width and height of a bounding box for the potential target vehicle. Once the image has been scanned, detection regions with confidence scores greater than a predefined threshold are selected and a non-maximum suppression (NMS) algorithm is applied to the bounding boxes associated with the selected detection regions. The NMS algorithm outputs a set of proposal regions in the image 202 which are likely to include the target vehicle.

In the second processing path, the proposal regions predicted from the proposal network 306 and the features maps 304 generated by the convolutional network 302 are combined at a pooling module 308. Proposal regions provided by the propose network 306 generally have feature vectors of different sizes or lengths. The pooling module 308 generates feature vectors of each proposal regions with a fixed or same length, since classifier 310 takes in standardized inputs. The pooling module 308 standardizes the dimension of the feature vectors from each proposal regions. Since features maps 304 of the whole image have already been extracted in the first processing path, it is not necessary to extract the feature maps 304 again. Therefore, the processor only has to find the location of the features for a selected proposal region. Because extracting features is in general very time consuming, reusing the extracted feature maps 304 saves time and computing power.

Once the regions of interest have been pooled, the classifier 310 classifies the object as a target object, i.e., as a target vehicle, pedestrian, cyclist, etc. A bounding box is also predicted for the target object. The bounding box has a width and height substantially equal to those of the target object within the image. Distance to the target object can be determined as well.

Figure 4:
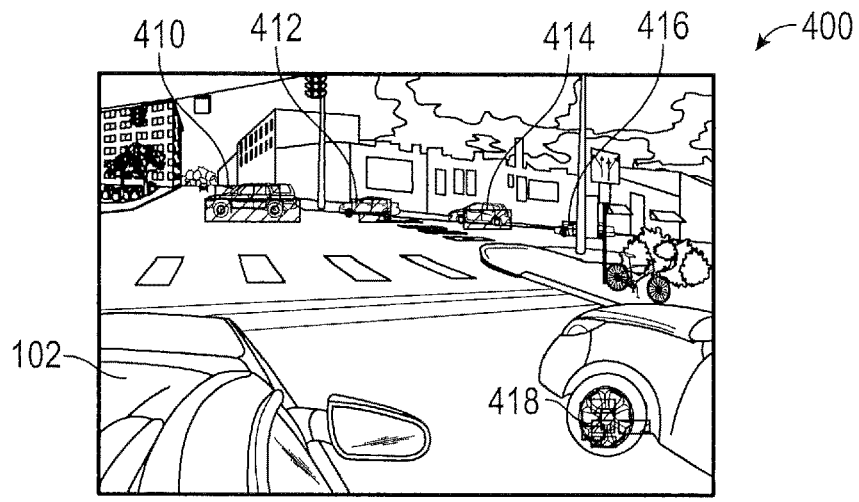
FIG. 4 shows the image of FIG. 2 with superimposed detection regions determined by a neural network.

FIG. 4 shows an image 400 that includes detection regions determined by the neural network 302 superimposed on the image 200 of FIG. 2. Detection regions are shown in which the confidence level is greater than a selected threshold. These detection regions form clusters 410, 412, 414, 416 and 418 at the location of the respective target vehicles 210, 212, 214, 216 and 218 of FIG. 2, respectively. For each cluster, a region of interest can be generated, wherein the region of interest is a proposed region in which to locate the target vehicle.

Figure 5:
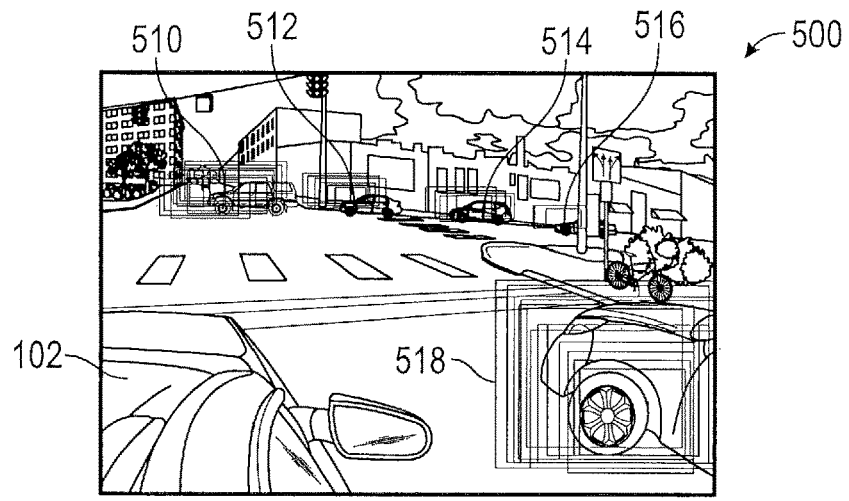
FIG. 5 shows a plurality of proposal regions of interest corresponding to the plurality of detection regions in FIG. 4.

FIG. 5 shows an image 500 that includes a plurality of proposal regions of interest 510, 512, 514, 516 and 518 corresponding to the plurality of detection regions 410, 412, 414, 416 and 418 in FIG. 4, respectively. The proposal regions of interests 510, 512, 514, 516 and 518 can be determined so as to encompass the target vehicle as determined by the neural network 302.

Figure 6:
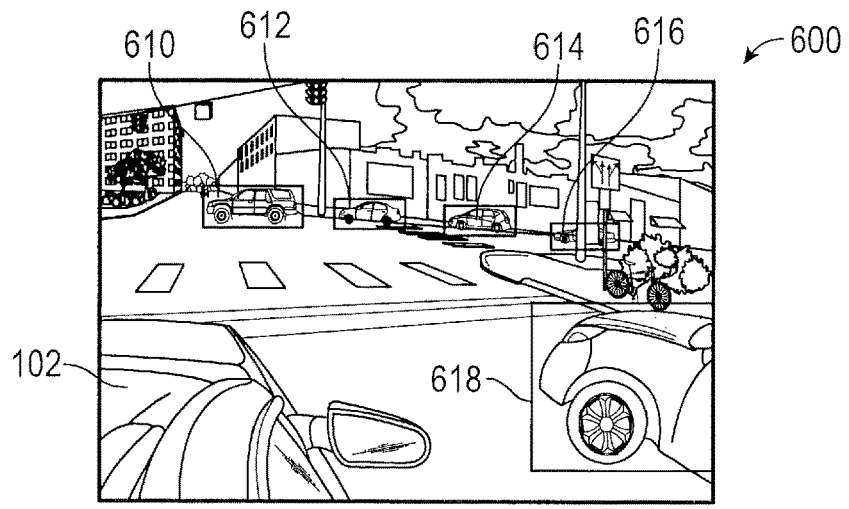
FIG. 6 shows bounding boxes corresponding to the regions of interest of FIG. 5.

FIG. 6 shows an image 600 that includes bounding boxes 610, 612, 614, 616 and 618 corresponding to the regions of interest 510, 512, 514, 516 and 518 of FIG. 5, respectively. A bounding box is drawn around each target vehicle. The bounding box indicates a region taken up by the target object. The autonomous vehicle 102 tracks motion of the bounding box in order to know the location of the target object. Once the bounding box is determined, its motion can be tracked as the associated target object moves within the field of view of the vehicle 102. Additionally, the target object can be classified and various parameters of motion of the target object, such as distance, azimuthal location, velocity, etc., can be determined. In particular, the processor can track the bounding box across a plurality of temporally separated images in order to track a motion of the vehicle across a line-of-sight of the vehicle 102.

Figure 7:
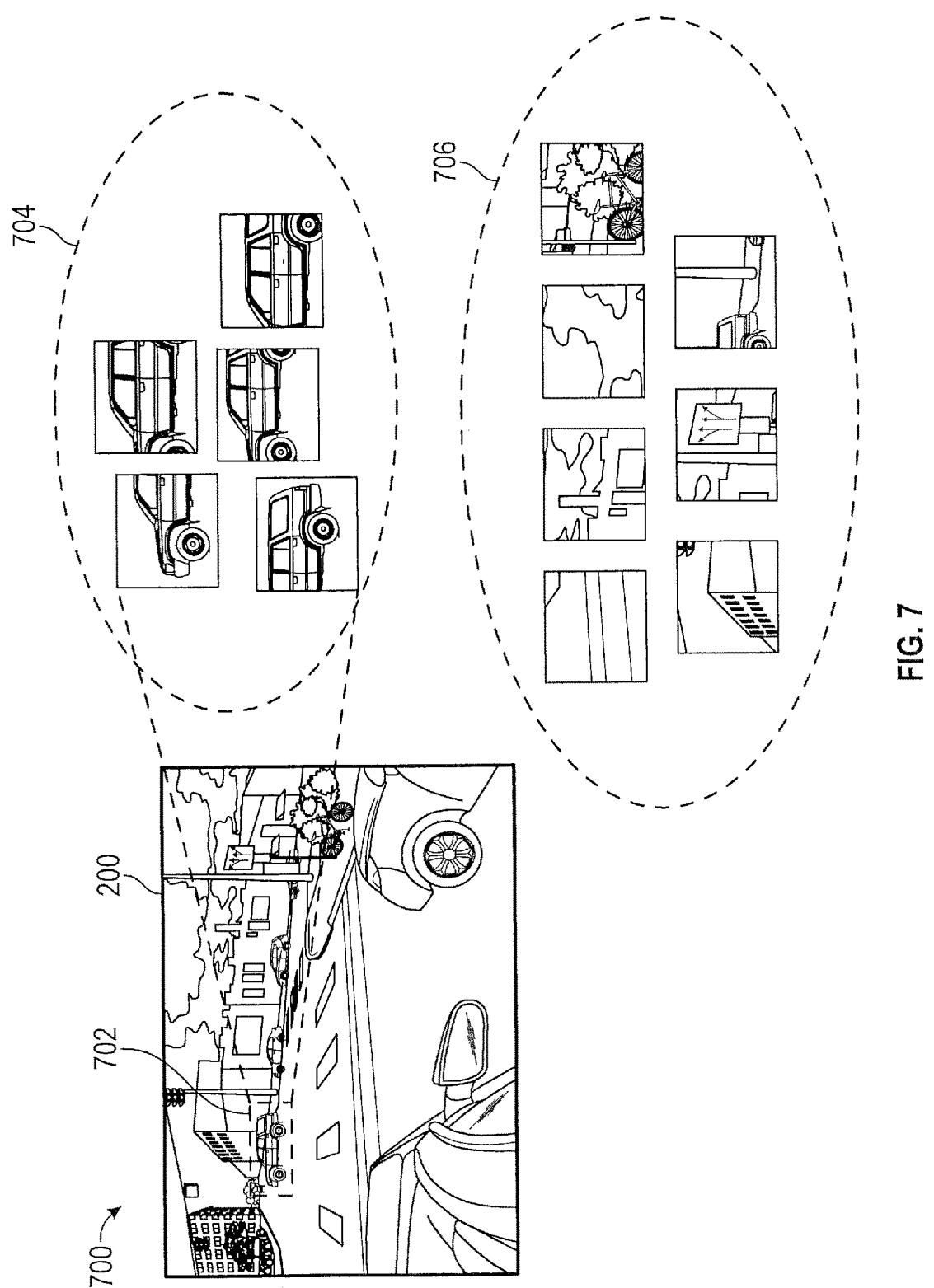
FIG. 7 shows a diagram illustrating a process for selecting image patches for training a neural network.
Figure 8:
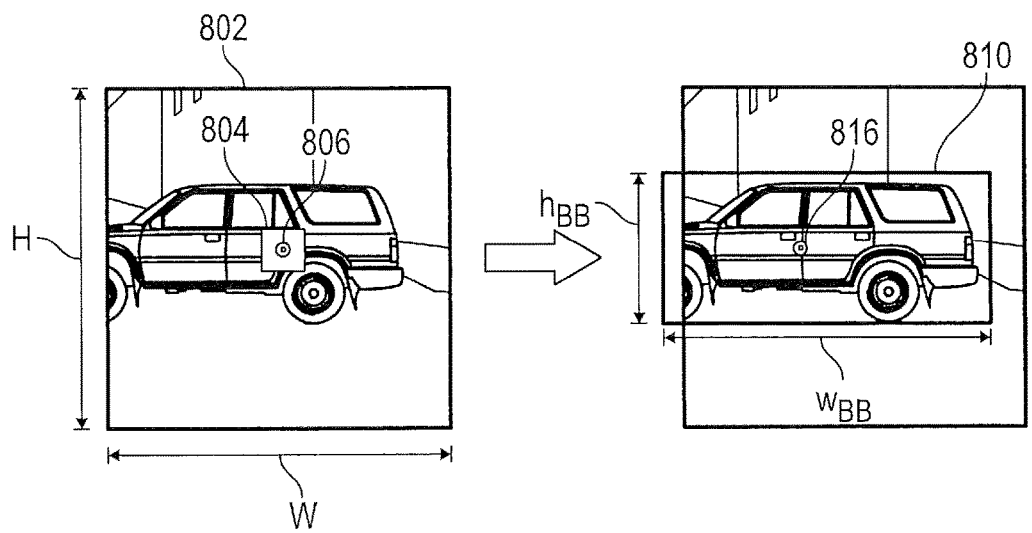
FIG. 8 illustrates a method by which the neural network learns to determine a proposal region for a target vehicle.
Figure 9:
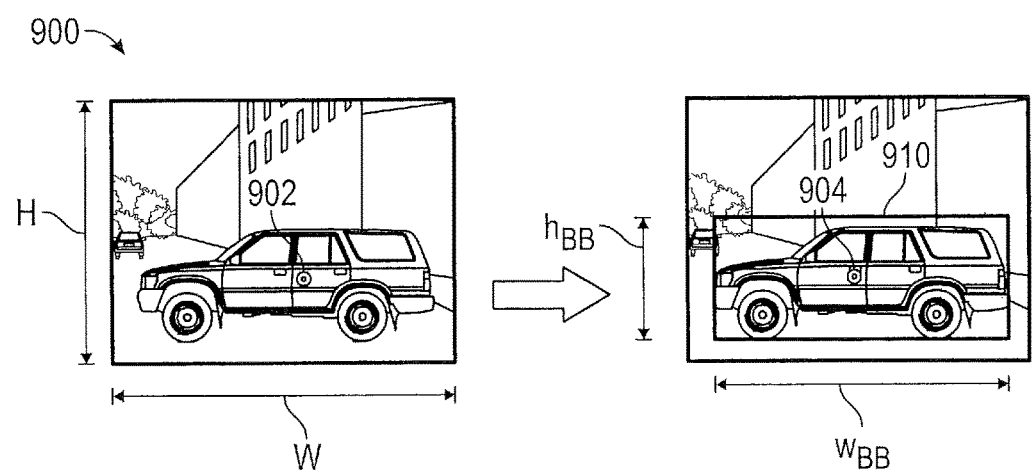
FIG. 9 illustrates a method by which the neural network learns to create a bounding box for the target object within a proposal region of interest.

FIGS. 7-9 illustrate a method of training a neural network for target vehicle detection. FIG. 7 shows a diagram 700 illustrating a process for selecting image patches for training a neural network. The diagram 700 includes the image 200 of FIG. 2 and several patches extracted from the image 200 for training purposes. Region 702 within image 200 is a region selected to include a target vehicle. The region 702 has a length and height that is substantially equal to the length and height the selected target vehicle. The selected region 702 is referred to as a ground truth positive region. A randomly selected set of patches that include at least a portion of the ground truth positive region 702 are selected, as shown in the image patches of group 704. In addition, a number of background or negative image patches are selected, which do not include any part of the target vehicle. These negative image patches are shown in group 706.

In one embodiment, the positive image patches 704 and the ground truth positive region 702 are input into the neural network in order to teach the neural network how to recognize the target vehicle and to predict a bounding box for the target vehicle. The negative image patches can be used to teach the neural network to recognize when an image does not include a part of a target vehicle.

FIG. 8 illustrates a method by which the neural network learns to determine a proposal region for a target vehicle. The ground truth image patch 702 is compared to an image bounded by the context region 802. The context region 802 has a height H and a width W and includes only a portion of the target vehicle. A detection region 804 is located at a center 806 of the context region 802. Upon comparison, the neural network is able to predict a proposal region, i.e. a bounding box 810 that more closely approximates the dimensions of the target vehicle. The bounding box 810 has height hss and width wBB and center 816 that is located on the target vehicle. The area of the bounding box 810 can extend outside of the area of the image patch 802. The height NB, width wBB and center 816 of the bounding box 810 can be determined using a regression analysis.

FIG. 9 illustrates a method by which the neural network learns to create a bounding box for the target object within a proposal region of interest 900. The proposal region of interest 900 may have an area that is greater than a bounding box of the target vehicle. Similarly to the learning process using the image patches, the neural network determine a center 902 of the proposal region of interest 900, determines a bounding box 910 for the target object having a height hss and width wBB and a center 904. The height hss, width wBB and center 904 of the bounding box 910 can be determined using a regression analysis.

If a distance to the target vehicle is known during the training process, the neural network can be taught how to estimate the distance to the target vehicle directly while determining the dimensions of the bounding box. The neural network can determine the distance to the target object using the regression analysis that is used to determine the width, height and center of the bounding box, whereas the regression analysis now also include the known distance to the target object.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the disclosure not be limited to the particular embodiments disclosed, but will include all embodiments falling within the scope of the application.

What is claimed is:

1. A method of driving an autonomous vehicle, comprising:
   obtaining an image of a surrounding region of the vehicle using a camera, wherein the image includes at least a portion of a target object;
   selecting a plurality of context regions within the image, wherein each context region includes a detection region;
   determining a plurality of proposal regions for the target object for each of the plurality of context regions;
   estimating a confidence level indicative of a presence of at least a portion of the target object in the detection region and selecting proposal regions having a confidence level greater than a selected threshold;
   merging the selected proposal regions to form a merged region;
   determining a bounding box for the merged region;
   determining a proposal region from the bounding box when the confidence level is greater than a selected threshold;
   determining a parameter of the target object within the bounding box; and
   altering a driving parameter of motion of the vehicle based on the parameter of the target object.

2. The method of claim 1, further comprising extracting feature maps of the target object from the context region and determining the confidence level and the bounding box from the extracted feature map.

3. The method of claim 1, further comprising classifying the target object within the merged region.

4. The method of claim 1, wherein the camera is at least one of: (i) a camera at a front end of the vehicle; (ii) a camera at a rear end of the vehicle; and (iii) a camera at a front end of the vehicle and a camera at a rear end of the vehicle.

5. The method of claim 1, further comprising tracking movement of a plurality of temporally spaced bounding boxes to determine a movement of the target object.

6. The method of claim 1, further comprising determining a velocity of the target object across a line of sight of the vehicle.

7. A system for driving an autonomous vehicle, comprising:
   a camera configured to obtain an image of a surrounding region of the vehicle;
   an actuation device for controlling a parameter of motion of the vehicle; and
   a processor configured to:
   selecting a plurality of context regions within the image, wherein each context region includes a detection region;
   determining a plurality of proposal regions for the target object for each of the plurality of context regions;
   estimating a confidence level indicative of a presence of at least a portion of the target object in the detection region and selecting proposal regions having a confidence level greater than a selected threshold;
   merging the selected proposal regions to form a merged region;
   determining a bounding box for the merged region;
   determining a proposal region from the bounding box when the confidence level is greater than a selected threshold;
   determining a parameter of the target object within the proposal region bounding box;
   control the actuation device to alter a parameter of motion of the vehicle based on the parameter of the target object.

8. The system of claim 7, wherein the processor is further configured to extract a feature map of the target object from the context region and determine the confidence level and the bounding box from the extracted feature map.

9. The system of claim 7, wherein the processor is further configured to classify the target object in the merged region.

10. The system of claim 7, wherein the camera is at least one of: (i) a camera at a front end of the vehicle; (ii) a camera at a rear end of the vehicle; and (iii) a camera at a front end of the vehicle and a camera at a rear end of the vehicle.

11. The system of claim 7, wherein the processor is further configured to track movement of a plurality of temporally spaced bounding boxes to determine a movement of the target object.

12. The system of claim 7, wherein the processor is further configured to determine a velocity of the target object across a line of sight of the vehicle.

13. A vehicle, comprising:
   a camera configured to obtain an image of a surrounding region of the vehicle;
   an actuation device for controlling a parameter of motion of the vehicle; and
   a processor configured to:
   selecting a plurality of context regions within the image, wherein each context region includes a detection region;
   determining a plurality of proposal regions for the target object for each of the plurality of context regions;
   estimating a confidence level indicative of a presence of at least a portion of the target object in the detection region and selecting proposal regions having a confidence level greater than a selected threshold;
   merging the selected proposal regions to form a merged region;
   determining a bounding box for the merged region;

determining a proposal region from the bounding box when the confidence level is greater than a selected threshold;

determining a parameter of the target object within the bounding box;

control the actuation device to alter the parameter of motion of the vehicle based on the parameter of the target object.

14. The vehicle of claim 13, wherein the processor is further configured to extract a feature map of the target object from the context region and determine the confidence level and the bounding box from the extracted feature map.

15. The vehicle of claim 13, wherein the processor is further configured to classify the target object in the merged region.

16. The vehicle of claim 13, wherein the camera is at least one of: (i) a camera at a front end of the vehicle; (ii) a camera at a rear end of the vehicle; and (iii) a camera at a front end of the vehicle and a camera at a rear end of the vehicle.

17. The vehicle of claim 13, wherein the processor is further configured to track movement of a plurality of temporally spaced bounding boxes to determine a movement of the target object across a line of sight of the vehicle.

* * * * *